United States Patent [19]
Kishi

[11] Patent Number: 5,522,442
[45] Date of Patent: Jun. 4, 1996

[54] TIRE, INCLUDING GROUND NON-CONTACTING RIB

[75] Inventor: Atao Kishi, Hiratsuka, Japan

[73] Assignee: The Yokohama Rubber Co., Tokyo, Japan

[21] Appl. No.: 323,788

[22] Filed: Oct. 17, 1994

[30] Foreign Application Priority Data

Dec. 15, 1993 [JP] Japan ................... 5-315273

[51] Int. Cl.$^6$ .................. B60C 13/02; B60C 101/00
[52] U.S. Cl. .................. 152/209 R; 152/523
[58] Field of Search .................. 152/209 R, 209 D, 152/523

[56] References Cited

U.S. PATENT DOCUMENTS

| | | | |
|---|---|---|---|
| 3,024,825 | 3/1962 | Kutsmichel | 152/209 R |
| 3,176,748 | 4/1965 | Giebhart | 152/209 R |
| 4,739,812 | 4/1988 | Ogawa et al. | 152/209 R |
| 4,905,747 | 3/1990 | Ogawa | 152/523 |
| 4,993,466 | 2/1991 | Ochiai | 152/209 R |
| 4,995,437 | 2/1991 | Enoki et al. | 152/209 R |
| 5,010,936 | 4/1991 | Numata et al. | 152/209 R |
| 5,115,849 | 5/1992 | Corner | 152/209 R |
| 5,323,825 | 6/1994 | Yamagishi et al. | 152/209 R |

FOREIGN PATENT DOCUMENTS

| | | | |
|---|---|---|---|
| 233103 | 9/1989 | Japan . | |
| 246806 | 10/1990 | Japan | 152/209 D |
| 103407 | 4/1992 | Japan | 152/209 R |

*Primary Examiner*—Steven D. Maki
*Attorney, Agent, or Firm*—Nikaido, Marmelstein, Murray & Oram

[57] ABSTRACT

A pneumatic radial tire including a plurality of main grooves so formed on a tread surface of a tread portion as to extend in a tire circumferential direction and ribs defined by said main grooves, characterized in that a thin groove extending inward and obliquely is formed on a transverse side surface of shoulder portion of the tread portion in the tire circumferential direction, a ground non-contacting rib protruding from the transverse side surface is formed inside the thin groove in a radial direction in such a manner as to be separated by the thin groove, and angle $\alpha$ of the transverse side surface to a normal of a plane S inclusive of the tread surface is from 20° to 60°, an angle $\beta$ of the thin groove to the normal of the plane S describes a line having an angle of 10° to 50°, and a vertical distance h of the groove bottom of the thin groove from the plane S, a groove depth d of the main groove and a vertical distance g of the top surface of the ground non-contacting rib from the plane S satisfy the relation $h/d=0.5$ to 1.2 and $g/h=0.5$ to 0.8.

5 Claims, 3 Drawing Sheets

TIRE, INCLUDING GROUND NON-CONTACTING RIB

BACKGROUND OF THE INVENTION

This invention relates to a pneumatic radial tire which improves shoulder wear at shoulder portions, and more particularly to a pneumatic radial tire for a heavy load.

In pneumatic radial tires, particularly in pneumatic radial tires for a heavy loads, improvement in wear resistance of a tread has been the most important problem. In conjunction with this wear resistance, a rib-based pattern has higher resistance than a block pattern, and the wear resistance can be improved much more by increasing a tread expansion width. Although the increase of the tread expansion width is effective for improving the wear resistance, there remains the problem that because a ground contacting pressure increases locally and remarkably at an end portion of a shoulder, shoulder end wear of the shoulder portion increases.

To reduce such shoulder end wear of the shoulder portion, a method which disposes a thin groove 26 at the end portion of a shoulder rib 1s in a tire circumferential direction as shown in FIG. 3 and thus reduces a peak ground contacting pressure at the shoulder end portion has been proposed in the past. However, according to this method, the thin groove 26 is likely to catch gravel, and the gravel so caught generates in turn cracks on the groove bottom. Furthermore, fall-off of outside thin ribs 25, that is, rib tear, is likely to occur.

To prevent this catch of gravel, a proposal has been made which continuously disposes the thin groove 26 in the tire circumferential direction in such a manner as to open in the transverse side surface of the tread portion as shown in FIG. 4. This counter-measure involves the problem that when a load to the tire is relatively small, the inner wall of the thin groove 26 on the outer diameter side so changes as to approach the groove wall on the inner diameter side as shown in FIG. 6A and provides the effect of reducing the ground contacting pressure of the shoulder end portion, but when a heavy load is applied to such an extent that the inner wall of the thin groove 26 on the outer diameter side comes into complete adhesion with the inner wall on the inner diameter side as shown in FIG. 6B, the ground contacting pressure drastically rises, so that the effect of reducing the ground contacting pressure becomes smaller than that of the counter-measure shown in FIG. 3. Moreover, because the inner wall on the outer diameter side and the inner well on the inner diameter side of the thin groove 26 repeat opening and closure with the revolution of the tire, the stress concentrates on the groove bottom, and cracks are more likely to occur due to this stress concentration.

To prevent the cracks occurring at the groove bottom of the thin groove, Japanese patent application Kokai publication No. 1-233103 proposes a method which disposes an extension portion which is curved towards the inside in the radial direction at the groove bottom of the thin groove 26 of FIG. 4, as shown in FIG. 5. This method provides the effects of reducing the cracks by dispersing the stress concentration by the curved extension portion of the thin groove 26, but cannot solve the problem of FIG. 4 in that the ground contacting pressure rises when a heavy load above a predetermined level is applied. Accordingly, it cannot sufficiently improve the uneven wear resistance. Furthermore, the thin groove 26 having the curved extension portion makes it difficult to fabricate the mold and to release the tire after molding from the molds, so that the tires are likely to be damaged.

SUMMARY OF THE INVENTION

It is an object of the present invention to provide a pneumatic radial tire, particularly a pneumatic radial tire for a heavy load, which can reduce the occurrence of the shoulder end wear at the shoulder portions without posing various problems such as cracks and rib tear resulting from the catch of gravel.

It is another object of the present invention to provide a pneumatic radial tire which does not make it difficult to produce the mold and to mold the tire.

To accomplish the objects described above, the present invention provides a pneumatic radial tire including a plurality of main grooves formed on a tread surface of a tread portion and extending in a tire circumferential direction and ribs defined by the main grooves, characterized in that an inclined thin groove extending inward and obliquely is formed in an inclined transverse side surface of shoulder portions of the tread portion in the tire circumferential direction, a ground non-contacting rib protruding from the transverse side surface is formed radially inwardly of the thin groove and separated from the transverse side surface by the thin groove, an angle $\alpha$ of the transverse side surface to a normal of a plane S inclusive of the tread surface is from 20° to 60°, an angle $\beta$ of an axially inner side wall of the thin groove to the normal of the plane S of is from 10° to 50° wherein the inclination direction of the axially inner side wall is the opposite of the inclination direction of the transverse side surface, and a vertical distance h of a bottom of said thin groove from the plane S, a groove depth d of the main grooves and a vertical distance g of a top surface of the ground non-contacting rib from the plane S satisfy the following relationships $h/d=0.5$ to $1.2$, and $g/h=0.5$ to $0.8$ wherein the ground non-contacting rib includes an apex which slips from the axially inner side wall of the thin groove when a heavy load is applied to the tire to relieve part of the load.

Because the thin groove is formed on the transverse side surface of the shoulder portion as described above, the tire of the present invention is free from the occurrence of cracks and rib tear resulting from the catch of gravel. Further, the tire of the present invention can reduce the peak ground contacting pressure by the combined structure of the thin groove and the ground non-contacting rib while improving rigidity of the shoulder end portion. Moreover, when a heavy load exceeding a predetermined level is applied, the ground non-contacting rib slips with respect to the inner wall of the thin groove on the outer diameter side, relieves a part of the load, and can thus effect suitable load transmission. Accordingly, the tire of the present invention is free from the drastic increase of the ground contacting pressure as has been observed in the structures shown in FIGS. 4 and 5, but can maintain a low ground contacting pressure. Because the ground contacting pressure is prevented from increasing as described above, the cracks do not occur at the groove bottom even when the thin groove is not curved. Accordingly, production of the mold and molding of the tire can be made easily.

DESCRIPTION OF THE PREFERRED EMBODIMENTS

Figure 1:
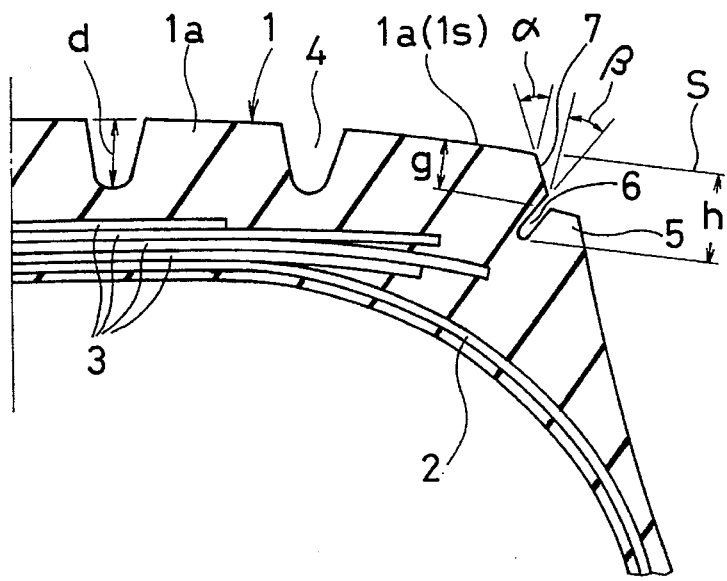
FIG. 1 is a semi-sectional view of a tread portion of a pneumatic radial tire in a meridian direction according to an embodiment of the present invention.

In the pneumatic radial tire according to the present invention shown in FIG. 1, a four-layered belt layer 3 is disposed on a carcass layer 2 at a tread portion 1. A plurality of main grooves 4 are formed on the tread surface in such a manner as to extend in a tire circumferential direction and to form a plurality of ribs 1a divided by these main grooves 4.

A thin groove 6 extending obliquely inward is disposed on the transverse side surface (non-contacting portion) of the shoulder portion of the tread 1 in such a manner as to extend in the tire circumferential direction. A non-contacting rib 5 which protrudes sideways and having a trapezoidal section is formed inside the thin groove 6 in the radial direction with the thin groove 6 being the boundary. A wall surface 7 having a doglegged section defined by the transverse side surface and the inner wall of the thin groove 6 is formed outside the thin groove 6 in the radial direction.

Figure 3:
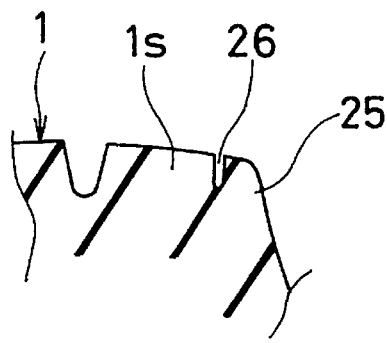
FIGS. 3 to 5 are schematic sectional views of a shoulder rib of a conventional pneumatic radial tire, respectively.

In this way, the radial tire of the invention has the oblique thin groove 6 formed on the transverse side surface of the shoulder portion but is not equipped with the thin groove 26 on the tread surface of the shoulder ribs 1s which is provided to the conventional tires shown in FIG. 3. Accordingly, the tire of the invention can prevent the occurrence of cracks due to the catch of gravel. Moreover, because the thin groove 6 is provided to the transverse side surface of the shoulder portion, the present tire can improve rigidity of the shoulder end portion much more than the conventional tire shown in FIG. 3, and can reduce the peak ground contacting pressure by disposition of the thin groove 6 in combination with the ground non-contacting ribs 5.

Figure 2A:
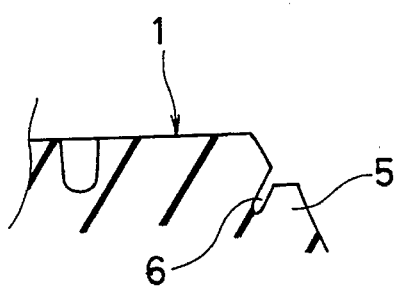
FIGS. 2A to 2C are explanatory views showing the state when a load is applied to the tire of the present invention.
Figure 2B:
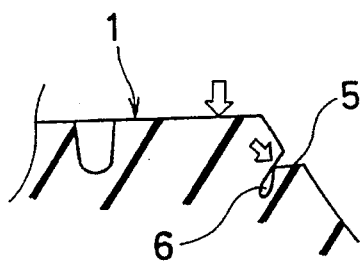
Figure 2C:
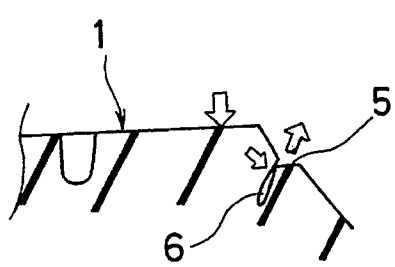

In other words, when no load is applied, the thin wall 6 and the non-contacting rib 5 are as shown in FIG. 2A; when the load is small, the inner wall of the thin groove 6 on the outer diameter side undergoes displacement in such a manner as to come into contact with the non-contacting rib 5 as shown in FIG. 2B to reduce the ground contacting pressure. When a heavy load is applied to such an extent that the inner wall on the diameter side of the thin groove 6 comes into close adhesion with the inner wall on the inner diameter side, however, the apex of the non-contacting rib 5 slips from the inner wall of the thin groove 6 on the outer diameter side to relieve a part of the load as shown in FIG. 2C. Consequently, suitable load transmission can be effected. Accordingly, the tire of the present invention is free from the problem of the drastic rise of the ground contacting pressure observed in the structures shown in FIGS. 4 and 5. Accordingly, the present tire can effectively reduce the shoulder end wear. Because the drastic rise of the ground contacting pressure is suppressed in the way described above, the occurrence of cracks can be restricted without disposing the curved extension portion to the thin groove 6, and the production of the mold as well as molding of the tire become easy.

To obtain the effects in the structure of the shoulder portion described above, the angle α of the transverse side surface of the shoulder portion to the normal of a plane S inclusive of the tread surface is 20° to 60° and is preferably 30° to 50°. The angle β of the thin groove 6 to the normal of the plane S is 10° to 50°, and is preferably within the range of 15° to 45°. Further, the distance g from the plane S to the top surface of the non-contacting rib 5 satisfies the relation g/h=0.5 to 0.8, preferably 0.65 to 0.75, with respect to the vertical distance h to the groove bottom of the thin groove 6, and the distance h satisfies the relation h/d=0.5 to 1.2, preferably 0.9 to 1.1, with respect to the groove depth d of the main groove 4.

When the angle of inclination a is less than 20° in the present invention, rigidity at the shoulder end portion excessively drops and movement of the shoulder rib 1s becomes great, so that non-uniform wear occurs. When the angle of inclination α is greater than 60°, on the other hand, rigidity becomes so great that the ground contacting pressure at the shoulder end portion rises and the effect of reducing the shoulder end wear drops. When the angle of inclination β is less than 10°, the effect of supporting the shoulder end portion by the non-contacting rib 5 drops. When it exceeds 50°, on the other hand, slip of the non-contacting rib 5 with respect to the inner wall of the thin groove 6 on the outer diameter side is not likely to occur when the load is applied to the shoulder end portion to thereby close the thin groove 6, and the ground contacting pressure drastically increases. Accordingly, the effect of reducing the shoulder end wear of the shoulder portion drops.

When a ratio of the distance h from the plane S to the groove bottom of the thin groove 6 to the groove depth d of the main groove 4 is less than 0.5, the ground contacting pressure at the shoulder end portion cannot be reduced sufficiently, and the effect of reducing the uneven wear at the shoulder portion drops. If it exceeds 1.2, the non-contacting rib 5 is likely to undergo deformation, and the shoulder rib is cannot be supported sufficiently.

If a ratio of the distance g from the plane S to the top surface of the non-contacting rib 5 to the distance h is less than 0.5, the top surface of the non-contacting rib 5 is likely to come into contact with the road surface, and damage such as rib tear is likely to occur. When it exceeds 0.8, the non-contacting rib 5 cannot sufficiently support the shoulder rib 1s.

In the present invention, the protrusion width from the open end of the thin groove 6 of the non-contacting rib 5 towards the side is preferably 2 to 10 mm. When the protrusion width is less than 2 mm, the action and effect of the non-contacting rib 5 described above drops, and if it exceeds 10 mm, problem will occur with running of the tire.

In the present invention, the sectional shape of the non-contacting rib is not particularly limited to the trapezoidal shape shown in FIG. 1, but may be an arbitrary shape such as a polygon and a semicircle, so long as the action and effect of the non-contacting rib can be obtained.

The groove width of the thin groove 6 is not particularly limited. In the case of the heavy load tire, for example, the groove width is not greater than 30% of the groove width of the main groove 4 and is preferably 1 to 3 mm.

The present invention is particularly effective when applied to the heavy load pneumatic radial tire, and can be preferably applied to heavy load pneumatic radial tires having a tread expansion width of 120 to 260 mm.

As described above, because the thin groove is defined on the transverse side surface of the shoulder portion of the tread portion in the pneumatic radial tire according to the present invention, the problems resulting from the catch of gravel such as cracks and rib tear do not occur, and the present tire can reduce the peak ground contacting pressure while improving rigidity of the shoulder end portion by virtue of the cooperation of the thin groove with the non-contacting rib. Moreover, even when a heavy load is applied to such an extent that the inner wall of the thin groove on the outer diameter side comes into complete adhesion with the inner wall on the inner diameter side, the non-contacting rib slips with respect to the inner wall of the thin groove on the outer diameter side, relieves a part of the load and effects suitable load transmission. Accordingly, the shoulder end wear of the shoulder portion can be effectively reduced without inviting the abrupt increase of the ground contacting pressure as in the case shown in FIGS. 4 and 5.

EXAMPLE 1

The tire of the present invention A, having the following specifications, was produced.

Tire specifications:

tire size: 11R22.5 14PR tread expansion width=210 mm sectional shape of tread portion (shoulder rib); see FIG. 1 groove depth d of main groove=14.6 mm groove width of main groove=14 mm vertical distance h from plane S to the bottom of thin groove h=14.6 mm groove width of thin groove=2.5 mm vertical distance g from the top surface of non-contacting rib to plane S=9.5 mm protrusion width (size) of non-contacting rib=mm h/d=1.0 g/h=0.65

Figure 4:
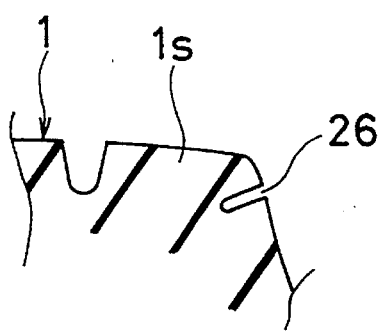
Figure 5:
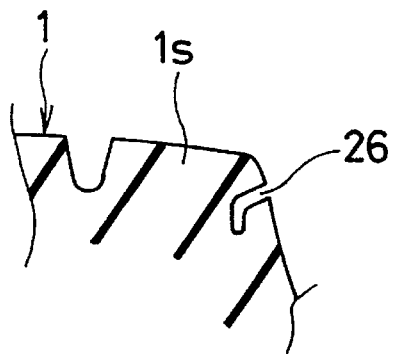
Figure 6A:
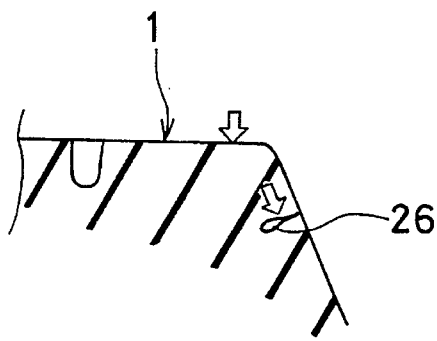
FIGS. 6A and 6B are explanatory views showing the state where a load is applied to the tread of FIG. 4, respectively.
Figure 6B:
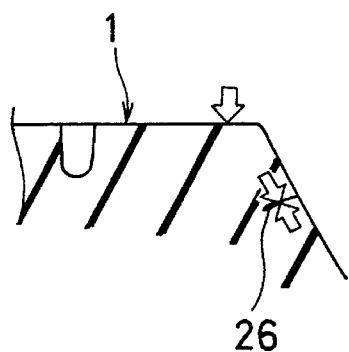

For comparison, conventional tires B, C and D having the same tire size, the same tread expansion width, the same groove width and groove depth of the main groove and the same groove width of the thin groove as those of the present invention were produced with only the exception that the sectional shapes of the shoulder rib of the tread portion were changed as shown in FIGS. 3 to 5, respectively. Also, a conventional tire E not provided with the thin groove in the conventional tire B was produced.

An air pressure of 7 kgf/cm² was charged into each of these five kinds of tires A, B, C, D and E, and the ground contacting pressure of the shoulder end portion of the tread portion (the outside ground contacting surface of the shoulder rib) when the load was gradually increased was measured. The result was shown in FIG. 7.

Figure 7:
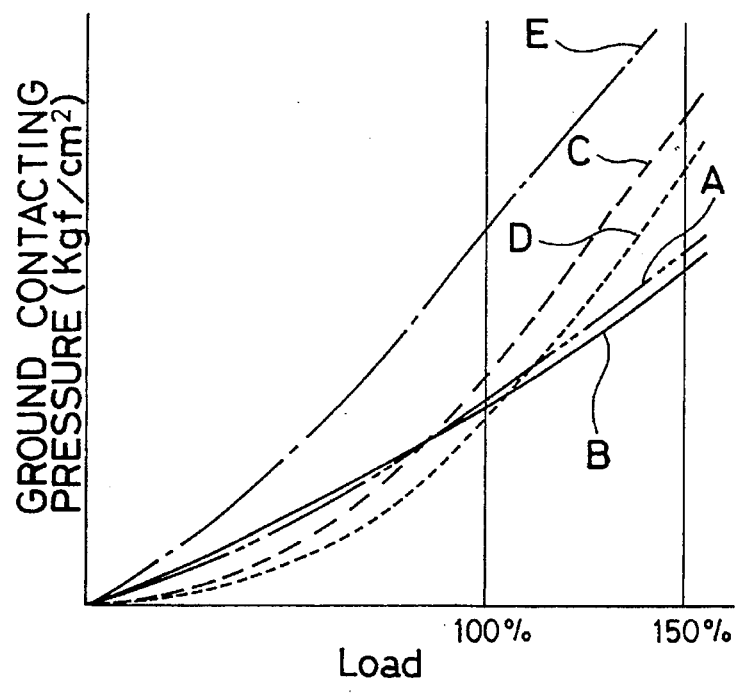
FIG. 7 is a graph showing the relationship between a load to each of various tires having a different shoulder rib structure and a ground contacting pressure at the shoulder end portion.

It can be understood from FIG. 7 that the rise of the ground contacting pressure was smaller in the tire A of the present invention than in the conventional tires C, D and E even in the large load range.

EXAMPLE 2

The tires 1(A) to 9 and Comparative Tires 1 to 5 were produced. Each tire had, in common, a tire size of 11R22.5 14PR, and a sectional shape of the shoulder portion of the tread portion shown in FIG. 1, but α, β, g/h and h/d were changed as tabulated in Table 1. The ground contacting pressure ratio, non-uniform wear resistance and crack resistance were evaluated for these fourteen kinds of tires and the conventional tires B, C and D described above by the following method, and the results were tabulated also in Table 1, respectively.

TABLE 1

|  | h/d | g/h | α (°) | β (°) | ground contacting pressure ratio (index) | non-uniform wear resistance (index) | crack resistance (index) |
| --- | --- | --- | --- | --- | --- | --- | --- |
| Conventional Tire |  |  |  |  |  |  |  |
| B | 1.0 | 0 | 5 | −5 | 100 | 100 | 100 |
| C | 1.0 | 0.8 | −70 | −70 | 200 | 70 | 80 |
| D | 1.0 | 0.65 | −70 | −5 | 180 | 70 | 160 |
| Comparative Tire |  |  |  |  |  |  |  |
| 1 | 1.0 | 0.65 | 0 | 30 | 80 | 60 | 200 |
| 2 | 0.8 | 0.5 | 10 | 70 | 200 | 70 | 200 |
| Tire of this Invention 1(A) | 1.0 | 0.65 | 40 | 30 | 100 | 100 | 200 |
| Comparative Tire 3 | 0.35 | 0.65 | 40 | 30 | 250 | 60 | 160 |
| Tire of this Invention |  |  |  |  |  |  |  |
| 2 | 0.5 | 0.65 | 40 | 30 | 120 | 90 | 200 |
| 3 | 1.2 | 0.65 | 40 | 30 | 90 | 90 | 200 |
| Comparative Tire 4 | 1.0 | 0.4 | 40 | 30 | 100 | 100 | 140 |
| Tire of this Invention |  |  |  |  |  |  |  |
| 4 | 1.0 | 0.5 | 40 | 30 | 100 | 100 | 180 |
| 5 | 1.0 | 0.8 | 40 | 30 | 90 | 90 | 200 |
| Comparative Tire 5 | 1.0 | 1.0 | 40 | 30 | 80 | 60 | 200 |
| Tire of this Invention |  |  |  |  |  |  |  |
| 6 | 1.0 | 0.65 | 20 | 30 | 90 | 90 | 200 |
| 7 | 1.0 | 0.65 | 60 | 30 | 120 | 90 | 200 |
| 8 | 1.0 | 0.65 | 40 | 10 | 110 | 100 | 180 |
| 9 | 1.0 | 0.65 | 40 | 50 | 140 | 90 | 200 |

Ground Contacting Pressure Ratio

An air pressure of 7.00 kg/cm² was charged into each test tire, and the ground contacting pressures at the center portion and the shoulder end portion (the outside contacting surface of the shoulder rib) when a 150% load of a maximum rated load was applied were measured so as to determine the ratio of the peak ground contacting pressure of the shoulder end portion to the ground contacting pressure of the center portion. Evaluation was represented by an index which was based on the value of the conventional tire B as the reference (100). The closer this index to 100, the more excellent the shoulder end wear resistance.

Non-uniform Wear Resistance

After an air pressure of 7.00 kg/cm² was charged to twenty test tires, each tire was fitted to a front wheel of a vehicle. A normal load of the JATMA standard was applied and the vehicle was run on 99% pavement and 1% hazardous road for 30,000 km. The occurrence of non-uniform wear at the tread shoulder portion of each tire was examined with eye, and a reciprocal of the number of tires in which non-uniform wear occurred was determined. Evaluation was expressed by an index which was based on the value of the conventional tire B as the reference (100). The greater this index, the higher the non-uniform wear resistance.

Crack Resistance

In the non-uniform wear test described above, the occurrence condition of the cracks at the groove bottom of the thin groove was examined with eye, the number of tires in which the cracks occurred was counted, and the reciprocal of this number was determined. Evaluation was represented by the index based on the value of the conventional tire B as the reference (100). The greater the index, the more excellent the crack resistance.

It can be understood from Table 1 that while keeping by far a greater crack resistance than the conventional tire B, the tires 1 to 9 according to the present invention had equivalent non-uniform wear resistance and higher shoulder end wear resistance. In the conventional tire C, the occurrence of non-uniform wear and the occurrence of cracks at the groove bottom of the thin groove could be observed, and in the conventional tire D, non-uniform wear was found occurring, though the occurrence of cracks was not observed.

What is claimed is:

1. A pneumatic radial tire including a plurality of main grooves formed on a tread surface of a tread portion and extending in a tire circumferential direction and ribs defined by said main grooves, characterized in that an inclined thin groove extending inward and obliquely is formed in an inclined transverse side surface of shoulder portions of said tread portion in the tire circumferential direction, a ground non-contacting rib protruding from said transverse side surface is formed radially inwardly of said thin groove and separated from said transverse side surface by said thin groove, an angle $\alpha$ of said transverse side surface to a normal of a plane S inclusive of said tread surface is from 20° to 60°, an angle $\beta$ of an axially inner side wall of said thin groove to the normal of said plane S is from 10° to 50° wherein the inclination direction of the axially inner side wall is the opposite of the inclination direction of the transverse side surface, and a vertical distance h of a bottom of said thin groove from said plane S, a groove depth d of said main grooves and a vertical distance g of a top surface of said ground non-contacting rib from said plane S satisfy the following relationships h/d=0.5 to 1.2, and g/h=0.5 to 0.8 wherein the ground non-contacting rib includes an apex which slips from the axially inner side wall of the thin groove when a heavy load is applied to the tire to relieve part of the load.

2. A pneumatic radial tire according to claim 1, wherein said angle $\alpha$ is 30° to 50°, said angle $\beta$ is 15° to 45°, said ratio h/d is 0.9 to 1.1 and said ratio g/h is 0.65 to 0.75.

3. A pneumatic radial tire according to claim 1, wherein a width of said top surface of said ground non-contacting rib from the open end of said thin groove to an outer surface of a side wall of said tire is 2 to 10 mm.

4. A pneumatic radial tire according to claim 1, wherein the sectional shape of said ground non-contacting rib is trapezoidal.

5. A pneumatic radial tire according to claim 1 wherein a tread expansion width of said tire is 120 to 260 mm.

* * * * *